Patented Dec. 8, 1953

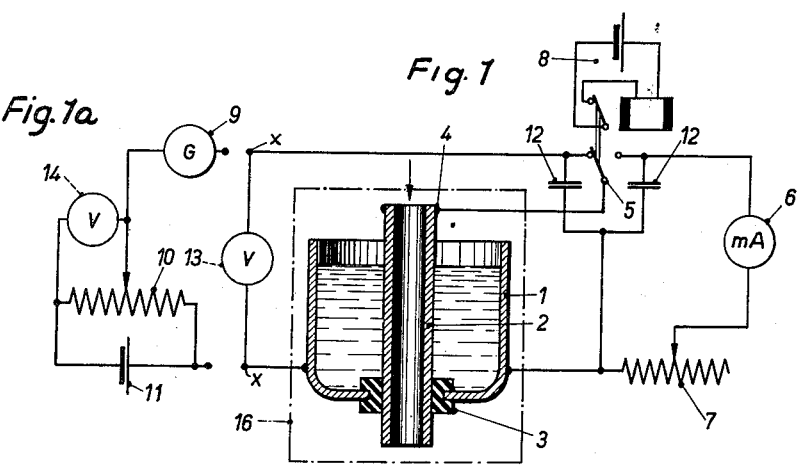
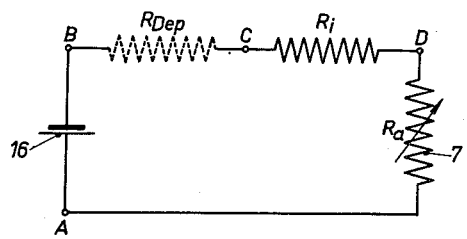
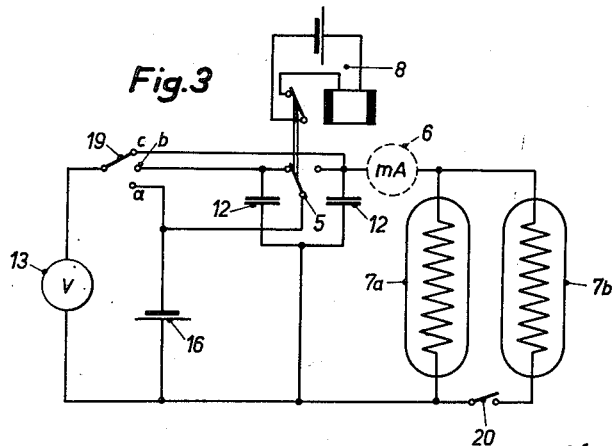

2,662,211

UNITED STATES PATENT OFFICE 2,662,211

DEVICE FOR MEASURING THE DISCHARGE VOLTAGE OF GALVANIC CELLS

Adolf Marko and Karl Kordesch, Vienna, Austria

Application June 8, 1951, Serial No. 230,512

Claims priority, application Austria June 21, 1950

10 Claims. (Cl. 324—29)

The invention relates to a device for measuring the discharge voltage of galvanic primary or secondary cells and has the primary object to ascertain the terminal voltage of the cell under load while eliminating the ohmic resistance thereof, which is important for testing and calibrating purposes.

In primary and secondary cells the electrochemically generated E. M. F. is, as well known, influenced, by polarisation which however can be eliminated more or less by a depolarising process, e. g. by application of a manganese dioxide- or gas-depolarisation. The terminal voltage occurring when discharging such a cell can be expressed by the E. M. F. of the cell diminished by the voltage drop caused by the virtual resultant internal resistance thereof, which is however, partly only of an ohmic nature, to wit as far as the resistance constituents depending on the electrodes, the electrolyte and the boundary faces between the electrodes and the electrolyte are concerned. Although the influence of an incomplete depolarisation can be expressed in a substitute scheme as a voltage drop (internal resistance constituent), it is distinguished from the ordinary ohmic constituents of the internal resistance insofar as it is a function of the efficiency of depolarisation and of the discharge current i. e. it represents a value which depends e. g. with gas depolarisation of a porous electrode on the catalytic transfer reaction, on the porosity of the electrode as well as on the pressure and oxygen content of the gas or, with Leclanché cells say on the chemical reactivity of the manganese dioxide mixture or generally speaking on the composition of the depolariser.

The known processes for measuring the internal resistance of galvanic cells give for the reasons stated hereinabove a resultant value of a virtual internal resistance which is composed of completely heterogeneous constituents. In some cases it is, however, of importance to be able to investigate the individual terms separately which influence this resultant value of internal resistance, and particularly the action of the depolariser. For example in developing primary or secondary cells there is the requirement of distinguishing whether a high internal voltage drop observed is due to a bad depolariser or to a high resistance of passage of the current due to unfavourable selection of the electrodes and/or electrolyte.

Moreover in methods for measuring the partial pressure of depolarising gas constituents of gas mixtures wherein the electrical output in the load circuit of a primary cell depolarised by the gas tested is evaluated as a measurement quantity; a well defined terminal voltage is desirable for the purpose of calibration which is independent of voltage drops due to ohmic internal resistances and which is influenced by depolarisation only.

The voltage drop caused merely by the imperfect action of the depolariser which remains practically constant owing to the sluggishness of the electrochemical and physical process which determine the conditions of depolarisation in the cell when releasing the same for a short period from a given load, will be referred to in what follows of the "depolariser voltage drop," as distinguished from the voltage drop caused by the ohmic internal resistance of the cell.

The E. M. F. of the cell reduced merely by the said "depolariser voltage drop" will be referred to as the "modified terminal voltage" of the cell.

Measuring of this modified terminal voltage of galvanic primary or secondary cells which is not affected by ohmic internal resistance and complies with the requirements set forth hereinabove i. e. indicates the conditions of depolarisation, is a particular object of our invention.

A device for measuring the discharge voltage of a galvanic cell according to the invention broadly comprises in combination: a loading circuit including an adjustable loading resistance, a measuring circuit of a high resistance preventing loading of the galvanic cell by the said measuring circuit and including a voltage measuring instrument, and a periodically operating throw-over switch connecting the said cell alternately to the said loading circuit and to the said measuring circuit at a high rate, whereby owing to the sluggishness of the depolarising reactions in the cell the depolarising conditions in the cell remain substantially constant during the short periods of connecting the said cell to the said measuring circuit.

The throw-over switch of the measuring device according to the invention is conveniently constructed for automatic operation, and is controlled preferably electromechanically (e. g. by a throw-over relay) or, particularly when a high throw-over frequency is desired, by means of electronic valves such as rectifiers or the like.

According to a preferred embodiment of the invention the device for measuring the discharge voltage of a galvanic cell includes a battery bridged over by a potentiometer and with one of its poles connected to the said galvanic cell, a voltmeter connected between the other pole of said battery and the tapping point of the said potentiometer, a galvanometer connected with the said tapping point, the said arrangement of battery, potentiometer, voltmeter and galvanometer forming together a measuring circuit of high resistance preventing the loading of the said cell.

According to another embodiment of the invention, the device for measuring the discharge voltage of a galvanic cell may comprise in combination: a loading circuit including an adjustable loading resistance and a milliammeter in series; a measuring circuit including a voltage measuring instrument and a manually operated throw-over switch; and a periodically operating throw-over switch connecting the said cell alternately to the said loading circuit and to the said measuring circuit at a high rate, the said manually operated throw-over switch having a first position connecting the said voltage measuring instrument directly to the terminals of the galvanic cell, whereby in the interrupted rest condition of the said periodically operated throw-over switch the E. M. F. of the cell is measured at zero-current and zero depolariser resistance; a second position connecting the said voltage measuring instrument to the said periodically operating throw-over switch whereby during operation of the said periodically operating throw-over switch the modified E. M. F. of the galvanic cell is measured; and a third position shunting the said voltage measuring instrument directly to the said loading circuit whereby the voltage drop on the said loading resistance is measured.

The device for measuring the discharge voltage of a galvanic cell according to the invention may comprise if desired in the loading circuit at least two iron-hydrogen resistance cells shunted with respect to one another, manually operated switch means having positions switching one or more of the said iron-hydrogen resistance cells into the said loading circuit, and a milliammeter in series with the said shunted iron-hydrogen resistance cells.

Further objects and features of the invention will become apparent later from a more detailed description thereof.

In order that the invention may be better undertsood and readily carried into effect some embodiments of the invention will now be described by way of example with reference to the accompanying drawing, in which:

Fig. 1 shows diagrammatically an embodiment of a measuring device according to the invention.

Figure 1a shows an alternative form of measuring circuit which may be connected to the terminals x—x in Figure 1 in place of the voltmeter 13 shown therein.

Fig. 2 shows a substitute scheme of the resistance occuring in the load circuit for the explanation of the manner of operation of the invention, and Fig. 3 shows diagrammatically a modified embodiment of a measuring device according to the invention.

Referring now to Fig. 1, a primary cell 16 with oxygen depolarisation consists of a zinc vessel 1 serving as the dissolving electrode and filled with caustic potash solution, and of a depolarisable carbon electrode 2. The electrode 2 is of tubular construction and is passed through the bottom of the vessel 1 with interposition of sealing sleeve 3. The depolarising gas, e. g. air or oxygen, is introduced into the bore of the electrode 2 in the direction of the arrow, and diffuses through the pores of the carbon body towards the boundary face of the electrode and the electrolyte and acts there as a depolariser. The loading circuit of the cell is connected on the one hand to the zinc vessel 1, and on the other hand to a metal ring 4 encircling the electrode 2, and includes a vibrator-like throwover switch 5, a milliammeter 6 and adjutsable resistance 7. To the second contact piece of the said throw-over switch 5 the circuit for measuring the voltage is connected which includes for example a voltmeter 13. In order to obviate a loading of the cell, a voltmeter of an appropriately high ohmic resistance (valve voltmeter) has to be used. One may alternatively carry out the measuring of the voltage according tot he compensation method, e. g. by using a battery 11 (Figure 1a) bridged over by a potentiometer 10, and by connecting the tapping of the potentiometer via a galvanometer 9 to the voltage measuring contact piece of the throw-over switch 5. For the purpose of ascertaining the compensating voltage, a voltmeter 14 is conveniently inserted into the measuring circuit in such a manner that it loads merely the powerful compensating battery 11. The compensating voltage may then be computed as the difference between the terminal voltage of battery 11 and the voltage indicated on meter 14.

For the periodical operation of the throw-over switch 5 a self-interrupter circuit 8 is provided in the embodiment of the invention illustrated in Fig. 1. The loading and measuring circuits are bridged-over by condensers 12 for the purpose of avoiding switching impulses.

The throw-over switch operates for example at a frequency of 50 C. P. S. so that the measuring period amounts to less than $1/100$ sec. In this short time the depolarisation in the cell practically does not change because of the sluggishness of the diffusion and of the depolarisation process; a modified terminal voltage, free from voltage drops caused by ohmic internal resistance constituents, can be measured for the loading current as indicated on the milliammeter 6 (mean value).

It may be convenient to construct the throw-over switch 5 in such a manner that the contact period for the loading is longer than that for measuring the voltage, since the non-loading voltage measuring circuit is held practically at constant voltage during the interruption periods by the associated condenser 12. This can be achieved e. g. with rotating throw-over switches in a simple manner by the use of unequally long contact segments.

In Fig. 2 a substitute scheme is illustrated for the explanation of the measuring process described. The measuring cell is represented by a battery 16; between the points A and B the E. M. F. of the cell is effective, which in the case of idling ($R_a = \infty$) can be measured between the terminals A and D. In series with the cell 16 lies a virtual resistance which corresponds to the voltage drop caused by incomplete depolarisation. This depolarisation resistance $R_{Dep}$ is followed by the ohmic internal resistance proper $R_i$ of the cell. While the ordinary measurements of voltage are made at the terminals A and D of the cell, with the internal resistance $R_i$ eliminated by the present invention, the point C is made accessible for the voltage measurement so that the modified E. M. F. of the cell, i. e. the E. M. F. thereof diminished by the voltage drop at the depolariser only, is measured, the depolariser resistance $R_{Dep}$ having the value corresponding to the intermittent loading of the cell.

For the testing of primary- or secondary cells the measuring device described can be further developed according to Fig. 3. The measuring device according to Fig. 3 is constructed similarly to that according to Fig. 1, but is supplemented by a manually operated throw-over switch 19 in the voltage measuring circuit. The throw-over switch 19 has three positions $a$, $b$ and $c$ of which the first one, $a$, allows in the contact-free middle position of the automatic throw-over switch 5 the measuring of the E. M. F. of the cell 16 without discharge of current; the second position, $b$, allows, with periodical operation of the throw-over switch 5, the measuring of the "modified terminal voltage" of the cell, as explained hereinabove, and the third position, $c$, allows the measuring of the voltage drop on the loading resistance $R_a$. With the common values of voltage in the three positions of the throw-over switch consecutively denoted $Va$, $Vb$ and $Vc$, the apparent resistance of the depolariser comes out as $$R_{Dep} = \frac{V_a - V_b}{I}$$

and the ohmic internal resistance as $$R_i = \frac{V_b - V_c}{I}$$

In this manner these heterogeneous constituents of the virtual resultant internal resistance can be resolved from one another.

Instead of measuring the current $I$ by a milliammeter 6 in the loading circuit this current can alternatively be adjusted to a constant value by a current-stabilising device, such as current-controlling iron-hydrogen resistance cells, as indicated in Fig. 3 by the variators $7a$ and $7b$ which can be shunted with respect to one another by means of a switch 20 for the purpose of modifying the loading.

While we have described what may be considered as particularly useful embodiments of our said invention we wish it to be understood that we do not limit ourselves to the particular details and dimensions described and shown, for obvious modifications will occur to a person skilled in the art according to the circumstances and requirements under which our said invention is to be used.

What we claim as our joint invention and desire to secure by Letters Patent is:

1. A device for measuring the discharge voltage of a galvanic cell comprising in combination: a loading circuit including an adjustable loading resistance, a measuring circuit of a high resistance preventing loading of the galvanic cell by the said measuring circuit and including a voltage measuring instrument, and a periodically operating throw-over switch connecting the said cell alternately to the said loading circuit and to the said measuring circuit at a high rate, whereby owing to the sluggishness of the depolarising reactions in the cell the depolarising conditions in the cell remain substantially constant during the short periods of connecting the said cell to the said measuring circuit.

2. A device for measuring the discharge voltage of a galvanic cell as claimed in claim 1, wherein the said voltage measuring instrument is an electronic valve voltmeter of high ohmic resistance.

3. A device for measuring the discharge voltage of a galvanic cell as claimed in claim 1 wherein the said periodically operating throw-over switch is an automatically operating switch.

4. A device for measuring the discharge voltage of a galvanic cell as claimed in claim 2, wherein the said automatically operating throw-over switch is a relay switch, including a self interrupter circuit and condensers bridging over the said loading and measuring circuits.

5. A device for measuring the discharge voltage of a galvanic cell as claimed in claim 2 wherein the said automatically operating throw-over switch is a mechanical switch.

6. A device for measuring the discharge voltage of a galvanic cell comprising in combination: a loading circuit including an adjustable loading resistance and a milliammeter in series; a battery bridged over by a potentiometer, a galvanometer with one of its terminals connected to the tapping point of the said potentiometer, one terminal of the said potentiometer and the free terminal of said galvanometer being connected into a high resistance measuring circuit, and a periodically operating throw-over switch connecting in compensating relation the said cell alternately to the said loading circuit and to the said measuring circuit at a high rate, whereby owing to the sluggishness of the depolarising reactions in the cell the depolarising conditions in the cell remain substantially constant during the short periods of connecting the said cell to the said measuring circuit.

7. A device for measuring the discharge voltage of a galvanic cell comprising in combination: a loading circuit including an adjustable resistance and a milliammeter in series, a compensation voltage measuring system including a bridge circuit and a voltmeter arranged in said bridge circuit and a periodically operating throw-over switch connecting the said cell alternately to the said loading circuit and to the said measuring circuit at a high rate, whereby owing to the sluggishness of the depolarising reactions in the cell the depolarising conditions in the cell remain substantially constant during the short periods of connecting the said cell to the said measuring circuit.

8. A device for measuring the discharge voltage of a galvanic cell comprising in combination: a loading circuit including an adjustable resistance and a milliammeter in series, a battery bridged over by a potentiometer and with one of its poles connected to the said galvanic cell, a voltmeter connected between the other pole of said battery and the tapping point of the said potentiometer, a galvanometer connected with the said tapping point, the said arrangement of battery, potentiometer, voltmeter and galvanometer forming together a measuring circuit of high resistance preventing the loading of the said cell; and a periodically operating throw-over switch connecting the said cell alternately to the said loading circuit and to the said measuring circuit at a high rate, whereby owing to the sluggishness of the depolarising reactions in the cell the depolarising conditions in the cell remain substantially constant during the short periods of connecting the said cell to the said measuring circuit.

9. A device for measuring the discharge voltage of a galvanic cell comprising in combination: a loading circuit including an adjustable loading resistance and a milliammeter in series; a measuring circuit including a voltage measuring instrument and a manually operated throw-over switch; and a periodically operating throw-over switch connecting the said cell alternately to the said loading circuit and to the said measuring circuit at a high rate; the said manually operated throw-over switch having a first position connecting the said voltage measuring instrument directly to the terminals of the galvanic cell, whereby in the interrupted rest condition of the said periodically operated throw-over switch the E. M. F. of the cell is measured at zero-current and zero depolariser resistance; a second position connecting the said voltage measuring instrument to the said periodically operating throw-over switch, whereby during operation of the said periodically operating throw-over switch the modified E. M. F. of the galvanic cell is measured; and a third position shunting the said voltage measuring instrument directly to the said loading circuit, whereby the voltage drop on the said loading resistance is measured.

10. A device for measuring the discharge voltage of a galvanic cell, comprising in combination: a loading circuit including at least two iron-hydrogen resistance cells shunted with respect to one another, manually operated switch means having positions switching one or more of the said iron-hydrogen resistance cells into the said loading circuit, and a milliammeter in series with the said shunted iron-hydrogen resistance cells; a measuring circuit of a high resistance preventing loading of the galvanic cell by the said measuring circuit and including a voltage measuring instrument, and a periodically operating throw-over switch connecting the said cell alternately to the said loading circuit and to the said measuring circuit at a high rate, whereby owing to the sluggishness of the depolarising reactions in the cell the depolarising conditions in the cell remain substantially constant during the short periods of conecting the said cell to the said measuring circuit.

ADOLF MARKO.
KARL KORDESCH.

References Cited in the file of this patent

UNITED STATES PATENTS

| Number | Name | Date |
|---|---|---|
| 2,270,554 | Pugh | Jan. 20, 1942 |
| 2,540,225 | Wengel et al. | Feb. 6, 1951 |